though it in some cases may be less than 0.1 or more than 10 LHSV.

3,253,024
DECOLORIZING AND RECOVERING NAPHTHALENE 2,6-DICARBOXYLIC ACID
Byron E. Bohrer, Rosemont, and Alfred J. McNerney, Norwood, Pa., and Joseph F. Paulson, Claymont, Del., assignors to Sun Oil Company, Philadelphia, Pa., a corporation of New Jersey
No Drawing. Filed Apr. 4, 1962, Ser. No. 184,917
15 Claims. (Cl. 260—525)

This invention relates to improving the color of naphthalene 2,6-dicarboxylic acid. It relates also to a method of separating and recovering the dibasic acid from a specific solvent used in the decolorization process.

The manner of producing naphthalene 2,6-dicarboxylic acid and its esters, halides and amides is well known to those skilled in the art. Generally, a suitable method involves heating the potassium salt of α- or β-naphthoic acid to elevated temperatures to form the dipotassium salt of naphthalene 2,6-carboxylic acid and thereafter converting the dipotassium salt into either the free acid or its derivatives such as esters, amides, halides and the like. Operating conditions suitable for the conversion include a temperature within the range of 390° C. to 450° C. and pressures exceeding 20 atmospheres. It is most advantageous to carry out the conversion in an autoclave and in an atmosphere of an inert gas, such as nitrogen or carbon dioxide, or an inert gas containing carbon dioxide. Additionally, it is also known that the above-described reaction is advantageously improved by carrying out the conversion in the presence of catalysts; for example, metals such as lead, mercury, zinc, cadmium and their compounds. Cadmium and zinc and their compounds are especially effective catalysts.

Other equally well-known methods of preparing the 2,6-dibasic acid include the conversion of naphthalic acid into naphthalene 2,6-dicarboxylic acid by forming an alkali metal salt of naphthalic acid, heating the alkali metal salt of naphthalic acid to elevated temperatures whereby rearrangement of said naphthalic acid salt into the corresponding naphthalene 2,6-dicarboxylic acid salt is effected, and converting the naphthalene 2,6-dicarboxylic acid alkali metal salt into the free acid. Additionally, it is also known that 2,6-dimethylnaphthalene can be directly oxidized into naphthalene 2,6-dicarboxylic acid using an oxygen-containing gas in the presence of a catalyst such as selenium and nitric oxide.

Naphthalene 2,6-dicarboxylic acid is a well-known chemical compound, especially as a valuable intermediate in the production of high-molecular weight synthetic products. For example, in the form of its polyglycol esters it is useful in the production of films, threads and the like.

It has been discovered that the naphthalene 2,6-dicarboxylic acid produced by any method known to those skilled in the art, including the methods hereinabove disclosed, has an extremely poor color usually of an amber nature which renders the acid and its ester unsuitable for further use. The nature of the materials causing the color is not definitely known. It may be attributable to polymeric materials formed during the oxidation.

According to the present invention, a novel process is provided for decoloring and otherwise improving naphthalene 2,6-dicarboxylic acids. This is accomplished according to one embodiment of the invention by dissolving the 2,6-dibasic acid in a suitable solvent and then contacting the solution with a solid adsorbent such as activated charcoal. Another embodiment of the present invention relates to the recovery of the solid acids from the solvent after the solution has passed over the adsorbent. This is accomplished according to the invention by using a dialysis cell to effect the separation.

It is known that the solid naphthalene 2,6-dicarboxylic acid, hereinafter called 2,6-NDCA, is virtually insoluble in the usual solvents known to the art. However, it was discovered that 2,6-NDCA had substantial solubility in an N-dialiphatic substituted formamide boiling below about 250° C. The dialiphatic formamide may be represented by the formula

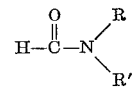

wherein R and R' represent aliphatic hydrocarbon radicals having from one to four carbon atoms per molecule. It should be noted that the term "dialiphatic" as used herein includes the unsaturated and cyclic aliphatic hydrocarbon radicals as well as the saturated and open chain aliphatic hydrocarbon radicals.

Suitable substituted amide solvents for the practice of this invention include dimethyl formamide, diethyl formamide, dipropyl formamide, diisopropyl formamide, dibutyl formamide, diisobutyl formamide, methyl ethyl formamide, methyl propyl formamide, methyl isobutyl formamide, ethyl isopropyl formamide, ethyl butyl formamide, isopropyl isobutyl formamide, divinyl formamide, diallyl formamide, and the like. However, the dialkylformamides are preferred and of these dimethyl formamide and diethyl formamide are the most satisfactory. Further, the dialiphatic formamides used herein need not be pure compounds but may be mixtures boiling between about 150° C. and about 250° C.

The solid 2,6-dibasic acid should be dissolved in the solvent at a temperature of less than 100° C., preferably, between 20° C. and 30° C. since the application of heat has a tendency to decompose the substituted amide solvent. Generally, from 2 to 10 grams of diacid per 100 milliliters (ml.) of solvent is sufficient to make a satisfactory solution of dibasic acid in solvent. In the case of dimethyl formamide (DMF), it was found that a solution containing 3 to 5 grams 2,6-NDCA per 100 ml. of DMF was satisfactory in the practice of this invention. For best results, the solution should be a saturated solution of dibasic acid in solvent.

According to the invention, the preferred adsorbent used for decolorizing the 2,6-NDCA is activated charcoal. However, other adsorbents which are useful in this invention include silica gel, aluminum silicates (such as the various clays and activated silica gels including attapulgus clay, montmorillonite, dehydrated and synthetically prepared composites of alumina and silica which have been heat activated, particularly those adsorbents fitting the art-recognized term "molecular sieve" and the like), activated alumina, particularly gamma-alumina, etc.

The contacting of the dibasic acid solution and the adsorbent is usually performed by passing the solution at ambient temperatures over a fixed bed of the adsorbent. However, moving and fluidized beds of adsorbent are equally satisfactory. Although ambient temperatures are preferred, elevated temperatures up to, say, the boiling point of the substituted amide solvent (e.g., for DMF the upper temperature limit would be approximately 150° C.). Atmospheric pressure is also preferable, but sub- and super-atmospheric pressures may be used if desired. For example, the pressure may range from about 10 mm. Hg absolute to about 20 atmospheres. Usually, the contacting is performed at a space velocity of from 0.1 to 10 volumes of solution per volume of adsorbent per hour (LHSV). Preferably, the space velocity will be from 1 to 4 LHSV.

Following the step of contacting the dibasic acid solution with the adsorbent, it is necessary to remove the solvent from the acid. Regular distillation proved undesirable because the slightest presence of moisture caused the substituted amide solvent to decompose. Vacuum distillation also proved undesirable since the last stages of operation were performed in a heavy slurry which proved impractical to handle.

Therefore, the additional embodiment of the present invention involves the removal of the amide solvent from the dibasic acid by using a dialysis chamber.

Generally, a suitable dialysis chamber contains at least two enclosed cells but may contain from 2 to 100 cells separated by membranes having a film thickness ranging from 0.05 to 10 mils. The membrane is chosen such that it is substantially permeable to the amide solvent and substantially impermeable to 2,6-NDCA and to a carrier liquid that is hereinbelow defined.

The preferred membrane is a polymer of 2-chlorobutadiene. Other suitable membranes include polyethylene, polypropylene, polytetrafluoroethylene, copolymers of butadiene and styrene, copolymers of isoprene and isobutylene, cross-linked copolymers of ethylene and propylene, vulcanized natural rubber, and the like. Laminated permeation membranes made from the above-listed materials can also be used. The laminated membrane consists of a thin layer or film of a selective membrane material mounted upon a thicker film of a membrane material having a higher permeation rate.

The operation of the dialysis chamber is fundamentally as follows: The charge solution is introduced into a first cell of the chamber wherein it contacts one side of the permeation membrane. The membrane permits the preferential permeation of the solvent in preferance to the dibasic acid. (As used herein the term "permeation" is intended to include "dialysis" since according to the invention the two functions are not distinct.) The permeated solvent may be removed from the opposite side of the membrane in the vapor or liquid state. Usually higher pressures are employed in the first cell or feed zone than in the second cell or permeate zone, so that there is a continuous flow from the first cell to the second cell.

It is important that the amide solvent be continuously removed from the permeate side of the membrane. Preferably, this is done by maintaining the amide solvent in liquid state and using a carrier liquid to sweep the amide solvent from the surface of the membrane. The preferred carrier liquid is a normal-paraffin hydrocarbon containing from 10 to 30 carbon atoms per molecule. The carrier liquid may boil above or below the boiling point of said amide solvent but best results are obtained if the carrier liquid boils above that of the solvent. For example, if DMF is the solvent, then n-hexadecane is a suitable carrier liquid. Other satisfactory carrier liquids include water, ethers, alcohols, glycols, glycerols each which preferably would be selected if it had a boiling point above the boiling point of the particular amide solvent used. However, it is understood that this invention may be practiced satisfactorily if the carrier liquid boils below the amide solvent. Naturally, the carrier liquid should be inert to said amide solvent and should also have a boiling point sufficiently different, i.e. 5–10° C., from the amide solvent boiling point so that separation of carrier liquid from solvent may be accomplished by distillation.

As the solvent passes through the membrane from the first cell to the second cell, the concentration of solvent decreases thereby causing the decolorized dibasic acid to precipitate and fall to the bottom of the first cell where it is removed in substantially dry, solid form.

The following example illustrates the practice of both embodiments of the present invention:

Example

Four (4) parts of naphthalene 2,6-dicarboxylic acid recovered as the conversion product of naphthalic acid salt as described in the prior art was dissolved in 100 parts of dimethyl formamide. The crude dibasic acid had an objectionable APHA (American Public Health Association) color exceeding the value of 100. The solution was passed at ambient temperature through a fixed bed activated charcoal at a LHSV of 1.5. The effluent from the fixed bed was then passed into the first cell of a two-cell dialysis chamber which contained a permeation membrane made of 2-chlorobutadiene rubber having a film thickness of about 0.5 mil. N-hexadecane was used as a carrier liquid on the opposite side of the membrane, i.e., in the second cell. As the DMF passed through the membrane, 2,6-NDCA precipitated out and was recovered. The 2,6-NDCA that was recovered from the dialysis chamber had a APHA color of 30, which is satisfactory. The permeated DMF was recovered from the n-hexadecane by distillation and was recycled for re-use. In like manner, the n-hexadecane carrier liquid was recycled for re-use.

I claim:
1. Method for removing color bodies from naphthalene 2,6-dicarboxylic acid which comprises:
    (a) dissolving naphthalene 2,6-dicarboxylic acid containing color bodies in a substituted amide solvent having the general formula

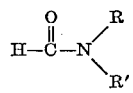

wherein R and R' represent aliphatic hydrocarbon radicals having from one to four carbon atoms per molecule to form a solution thereof,
    (b) contacting said solution with solid adsorbent thereby removing the color bodies from said acid,
    (c) passing the solution containing decolorized naphthalene 2,6-dicarboxylic acid into a first cell of a dialysis chamber containing at least two cells separated by a membrane substantially permeable to said amide and substantially impermeable to said acid,
    (d) recovering decolorized naphthalene 2,6-dicarboxylic acid from said first cell, and
    (e) removing said amide from a second cell of said dialysis chamber.
2. Method according to claim 1 wherein said membrane is selected from the group consisting of polyethylene, polypropylene, polytetrafluoroethylene, polymers of 2-chlorobutadiene, copolymers of butadiene and styrene, copolymers of isoprene and isobutylene, cross-linked copolymers of ethylene and propylene, and vulcanized natural rubber.
3. Method according to claim 2 wherein said amide is dimethyl formamide.
4. Method according to claim 3 wherein said membrane is a polymer of 2-chlorobutadiene.
5. Method according to claim 1 wherein additionally an inert carrier liquid is placed in said second cell.
6. Method according to claim 5 wherein said carrier liquid has a boiling point above the boiling point of said amide and is selected from the group consisting of water, ether, alcohol, glycol, glycerol, and n-paraffinic hydrocarbons.
7. Method according to claim 6 wherein said carrier liquid is a n-paraffinic hydrocarbon having from 10 to 30 carbon atoms per molecule.
8. Method according to claim 7 wherein said adsorbent is activated charcoal.
9. Method according to claim 1 wherein said adsorbent is activated charcoal.

10. Method of recovering naphthalene 2,6-dicarboxylic acid from a solution of said acid in a substituted amide solvent having the general formula

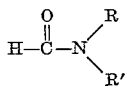

wherein R and R' represent aliphatic hydrocarbon radicals having from one to four carbon atoms per molecule which comprises:
(a) placing an inert carrier liquid into a first cell of a dialysis chamber containing at least two cells separated by a membrane substantially permeable to said amide and substantially impermeable to said acid and said carrier liquid,
(b) passing the solution of naphthalene 2,6-dicarboxylic acid and substituted amide into a second cell of said dialysis chamber whereby said amide passes through the membrane into said first cell thereby causing crystals of naphthalene 2,6-dicarboxylic acid to form in said second cell,
(c) removing the carrier liquid and said amide from the first cell, and
(d) recovering naphthalene 2,6-dicarboxylic acid from the second cell.

11. Method according to claim 10 wherein said carrier liquid has a boiling point above the boiling point of said amide and is selected from the group consisting of water, ether, alcohol, glycol, glycerol, and n-paraffinic hydrocarbons.

12. Method according to claim 11 wherein said carrier liquid is a n-paraffinic hydrocarbon having from 10 to 30 carbon atoms per molecule.

13. Method according to claim 12 wherein said amide is dimethyl formamide.

14. Method according to claim 13 wherein said membrane is selected from the group consisting of polyethylene, polypropylene, polytetrafluoroethylene, polymers of 2-chlorobutadiene, copolymers of butadiene and styrene, copolymers of isoprene and isobutylene, cross-linked copolymers of ethylene and propylene, and vulcanized natural rubber.

15. Method according to claim 14 wherein said membrane is a polymer of 2-chlorobutadiene.

References Cited by the Examiner

UNITED STATES PATENTS

| | | | |
|---|---|---|---|
| 2,773,028 | 12/1956 | Monet | 210—24 X |
| 2,811,548 | 10/1957 | Ham et al. | 260—525 |
| 2,849,482 | 8/1958 | Raecke et al. | 260—525 X |
| 2,947,687 | 8/1960 | Lee | 210—23 X |
| 2,953,502 | 9/1960 | Binning et al. | 210—23 X |
| 2,960,462 | 11/1960 | Lee et al. | 208—308 |
| 2,974,178 | 3/1961 | Hwa | 210—24 X |
| 3,043,891 | 7/1962 | Stuckey | 210—23 X |

LORRAINE A. WEINBERGER, *Primary Examiner.*

LEON ZITVER, *Examiner.*